(12) United States Patent
Staranowicz et al.

(10) Patent No.: US 11,151,704 B2
(45) Date of Patent: Oct. 19, 2021

(54) APPARATUS AND METHODS FOR ARTIFACT DETECTION AND REMOVAL USING FRAME INTERPOLATION TECHNIQUES

(71) Applicant: GoPro, Inc., San Mateo, CA (US)

(72) Inventors: Aaron Staranowicz, Carlsbad, CA (US); Ryan Lustig, Encinitas, CA (US); Desmond Chik, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 153 days.

(21) Appl. No.: 16/692,280

(22) Filed: Nov. 22, 2019

(65) Prior Publication Data

US 2020/0160495 A1 May 21, 2020

Related U.S. Application Data

(62) Division of application No. 15/583,794, filed on May 1, 2017, now Pat. No. 10,489,897.

(51) Int. Cl.
*G06T 5/00* (2006.01)
*G06T 5/20* (2006.01)
*G06T 5/50* (2006.01)
*G06T 7/215* (2017.01)
*H04N 7/00* (2011.01)
(Continued)

(52) U.S. Cl.
CPC .............. *G06T 5/50* (2013.01); *G06T 5/002* (2013.01); *G06T 5/20* (2013.01); *G06T 7/215* (2017.01); *H04N 7/014* (2013.01); *H04N 19/139* (2014.11); *G06T 2207/10016* (2013.01);
(Continued)

(58) Field of Classification Search
CPC .. G06T 5/002; G06T 5/20; G06T 5/50; G06T 7/215; G06T 2207/10016; G06T 2207/20192; H04N 7/0135; H04N 7/0137; H04N 7/014
See application file for complete search history.

(56) References Cited

U.S. PATENT DOCUMENTS 4,179,704 A 12/1979 Kaiser
6,480,632 B2 11/2002 Martins
(Continued)

FOREIGN PATENT DOCUMENTS

JP 2007172554 A * 7/2007

OTHER PUBLICATIONS

Achanta R., et al., 'Slic Superpixeis Compared to State-of-the-Art Superpixei Methods,' IEEE Transactions on Pattern Analysis and Machine intelligence, 2012, vol. 34 (11), pp. 2274-2282.
(Continued)

*Primary Examiner* — Yubin Hung
(74) *Attorney, Agent, or Firm* — Esplin & Associates, PC

(57) ABSTRACT

Methods and apparatus for the generation of interpolated frames of video data. In one embodiment, the interpolated frames of video data are generated by obtaining two or more frames of video data from a video sequence; determining frame errors for the obtained two or more frames from the video sequence, determining whether the frame errors exceed a threshold value; performing a multi-pass operation; performing a single-pass operation; performing frame blending; performing edge correction; and generating the interpolated frame of image data.

16 Claims, 7 Drawing Sheets

(51) Int. Cl.
*H04N 19/139* (2014.01)
*H04N 7/01* (2006.01)
(52) U.S. Cl.
CPC .. *G06T 2207/20192* (2013.01); *H04N 7/0135* (2013.01); *H04N 7/0137* (2013.01)

(56) References Cited

U.S. PATENT DOCUMENTS

| | | |
|---|---|---|
| 6,504,569 B1 | 1/2003 | Jasinschi |
| 6,611,607 B1 | 8/2003 | Davis |
| 6,728,317 B1 | 4/2004 | Demos |
| 6,950,632 B1 | 9/2005 | Yun |
| 6,996,244 B1 | 2/2006 | Slaney |
| 7,750,904 B2 | 7/2010 | Jojic |
| 8,290,253 B1 | 10/2012 | Wang |
| 8,395,657 B2 | 3/2013 | Jacob |
| 8,606,073 B2 | 12/2013 | Woodman |
| 9,171,577 B1 | 10/2015 | Newman |
| 9,396,588 B1 | 7/2016 | Li |
| 9,547,908 B1 | 1/2017 | Kim |
| 9,575,803 B2 | 2/2017 | Chauvet |
| 2003/0007567 A1 | 1/2003 | Newman |
| 2003/0147547 A1 | 8/2003 | Lin |
| 2004/0017504 A1 | 1/2004 | Prandoni |
| 2004/0034781 A1 | 2/2004 | Natarajan |
| 2004/0131229 A1 | 7/2004 | Acharya |
| 2004/0218830 A1* | 11/2004 | Kang ............... H04N 5/2352 382/274 |
| 2005/0117805 A1 | 6/2005 | Poutet |
| 2005/0249426 A1 | 11/2005 | Badawy |
| 2006/0071825 A1 | 4/2006 | Demos |
| 2006/0251289 A1 | 11/2006 | Williams |
| 2007/0092122 A1* | 4/2007 | Xiao ............... H04N 19/543 382/128 |
| 2007/0110298 A1 | 5/2007 | Graepel |
| 2008/0043145 A1* | 2/2008 | Someya ............... G06T 3/403 348/538 |
| 2008/0170626 A1 | 7/2008 | Sung |
| 2008/0180439 A1 | 7/2008 | Adabala |
| 2008/0270569 A1 | 10/2008 | McBride |
| 2008/0276089 A1 | 11/2008 | Tian |
| 2009/0132371 A1 | 5/2009 | Strietzel |
| 2009/0153730 A1 | 6/2009 | Knee |
| 2009/0324191 A1 | 12/2009 | Reusens |
| 2010/0054559 A1 | 3/2010 | Narayanan |
| 2010/0177977 A1 | 7/2010 | Seshadri |
| 2010/0266157 A1 | 10/2010 | Shin |
| 2010/0290530 A1 | 11/2010 | Huang |
| 2010/0296579 A1 | 11/2010 | Panchal |
| 2010/0315534 A1* | 12/2010 | Azuma ............... H04N 5/35545 348/234 |
| 2011/0063473 A1* | 3/2011 | Tsunekawa ............... H04N 5/347 348/222.1 |
| 2011/0141352 A1* | 6/2011 | Burns ............... H04N 7/0127 348/452 |
| 2011/0286625 A1 | 11/2011 | Petrovic |
| 2012/0002112 A1 | 1/2012 | Huang |
| 2012/0063670 A1 | 3/2012 | Woo |
| 2012/0170805 A1 | 7/2012 | Brown |
| 2012/0281871 A1 | 11/2012 | Reed |
| 2013/0051682 A1 | 2/2013 | Chung |
| 2013/0071041 A1* | 3/2013 | Jin ............... G06T 5/002 382/254 |
| 2013/0265460 A1* | 10/2013 | Wu ............... G06T 5/006 348/222.1 |
| 2013/0314442 A1 | 11/2013 | Langlotz |
| 2014/0022394 A1 | 1/2014 | Bae |
| 2014/0050454 A1 | 2/2014 | Slotte |
| 2014/0063061 A1 | 3/2014 | Reitan |
| 2014/0267801 A1 | 9/2014 | Grundmann |
| 2014/0347470 A1* | 11/2014 | Zhang ............... G06T 3/4038 348/118 |
| 2015/0371447 A1 | 12/2015 | Yasutake |
| 2016/0057363 A1 | 2/2016 | Posa |
| 2016/0080830 A1 | 3/2016 | Kim |
| 2016/0125633 A1 | 5/2016 | Windmark |
| 2016/0205341 A1 | 7/2016 | Hollander |
| 2016/0274338 A1 | 9/2016 | Davies |
| 2016/0358628 A1 | 12/2016 | Liu |
| 2016/0366396 A1 | 12/2016 | Kim |

OTHER PUBLICATIONS

Adsumilli C, 'A dissertation submitted in partial satisfaction of the requirements for the degree of Doctor of Philosophy in Electrical and Computer Engineering', Sep. 2005, 193 pages.

Adsumilli C. et al., 'A Dynamically Adaptive Constrained Unequal Error Protection Scheme for Video Transmission over Wireless Channels', Proceedings IEEE International Workshop on Multimedia Signal Processing, 2002, pp. 41-44, Virgin Islands, USA.

Adsumilli C. et al., 'A Hybrid Constrained Unequal Error Protection and Data Hiding Scheme for Packet Video Transmission', Proceedings IEEE International Conference on Acoustics, Speech, and Signal Processing (ICASSP), Apr. 2003, pp. V680-V683, Hong Kong.

Adsumilli C. et al., A Noise Based Quantization Model for Restoring Block Transform Compressed Images:, Proceedings of the IASTED International Conference Signal and Image Processing, Aug. 13-16, 2001, pp. 354-359, Honolulu, Hawaii, USA.

Adsumilli C. et al., 'A Robust Error Concealment Technique Using Data Hiding for Image and Video Transmission Over Lossy Channels', IEEE Transactions On Circuits And Systems For Video Technology, Nov. 2005, pp. 1394-1406, vol. 15(11).

Adsumilli C. et al., 'Adapive Wireless Video Communications: Challenges and Approaches', Proceedings of International Workshop on Packet Video, Apr. 2002, pp. 1-11, Pittsburgh, Pennsylvania, USA.

Adsumilli C. et al., 'Detector Performance Analysis Of Watermark-Based Error Concealment In Image Communications', Proceedings IEEE International Conference on Image Processing, 2005, pp. 916-919, vol. 3.

Adsumilli C. et al., 'Error Concealment in Video Communications by Informed Watermarking', PSIVT, 2006, pp. 1094-1102.

Adsumilli C. etal., 'Error Concealment in Video Communications Using DPCM Bit Stream Embedding', Proceedings IEEE International Conference on Acoustics, Speech and Signal Processing (ICASSP), Apr. 2005, pp. 11-169-11-172, Philadelphia, USA.

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,'arXiv preprint arXiv: 1511.00561, 2015. 14 pages.

Baker, et al., "A Database and Evaluation Methodology for Optical Flow" International Journal of Computer Vision 92.1 (2011): 1-31.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et al., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Boucherkha, S., et al., 'A Lossless Watermarking Based Authentication System For Medical Images', Would Academy of Science, Engineering and Technology, International Journal of Medical, Health, Biomedical, Bioengineering and Pharmaceutical Engineering, 2007, vol. 1, No. 1, pp. 20-23.

Brainard R.C., et al., "Low-Resolution TV: Subjective Effects of Frame Repetition and Picture Replenishment," Bell Labs Technical Journal, Jan. 1967, vol. 46 (1), pp. 261-271.

(56) References Cited

OTHER PUBLICATIONS

Brox, et al., 'High Accuracy Optical Flow Estimation Based on a Theory for Warping', European Conference on Computer Vision, Springer-Verlag Berlin Heidelberg, 2004. (12 pages).
Burt et al., 'A Multiresolution Spline with Application to Image Mosaics,' in ACM Transactions on Graphics (TOG), 1983, vol. 2, No. 4, pp. 217-236.
Carli M. et al., 'Video Watermarking in 3D DCT Domain', Proceedings of International Workshop on Spectral Methods and Multirate Signal Processing, Jun. 2005, pp. 141-144, Riga, Lavia, (Invited Paper).
Cavallaro, et al., 'Object-based video: extraction tools, evaluation metrics and applications', Visual Communicationsand Image Processing; Jul. 8, 2003-Jul. 11, 2003, Lugano Switzerland, XP030080620. (8 pages).
Chan et al., 'Active contours without edges'. IEEE Transactions on Image Processing, 2001, 10 (2), pp. 266-277 (hereinafter 'Chan').
Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.
Davis, et al., "The Visual Microphone: Passive Recovery of Sound from Video" (2014). (10 pages).
Didyk, et al., 'Joint View Expansion and Filtering for Automultiscopic 3D Displays', ACM Transactions on Graphics (TOG) 32.6 (2013): 221. (8 pages).
Elen, 'Whatever happened to Ambisonics' AudioMedia Magazine, Nov. 1991. 18 pages.
Freeman, et al., 'Shape-Time Photography' IEEE Computer Society Conference on Computer Vision and Pattern Recognition, vol. 2. IEEE, 2003. (7 pages).
Fridrich, J., et al., 'Lossless Data Embedding—New Paradigm in Digital Watermarking', EURASIP Journal on Applied Signal Processing, Oct. 29, 2001, pp. 185-196.
Gracias, et al., 'Fast Image Blending Using Watersheds and Graph Cuts,' Image and Vision Computing, 2009, vol. 27 (5), pp. 597-607.
Guo et al. ("Occlusion handling frame rate up-conversion," IEEE International Conference on Acoustics, Speech and Signal Processing, May 26-31, 2013) (Year: 2013).
H.264 (Oct. 2012) and/or ISO/IEC 14496-10:2012, Information technology—Coding of audio-visual objects—Part 10: Advanced Video Coding, 402 pages.
Haouzia et al., 'Methods for Image Authentication: A Survey,' Multimedia Tools Appl, 2008, 46 pages.
Herbst E., et al., 'Occlusion Reasoning for Temporal Interpolation Using Optical Flow,' Department of Computer Science and Engineering, University of Washington, Tech. Rep. UW-CSE-09-08-01,2009. 41 pages.
High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.
Hong, Wei ("Low-complexity occlusion handling for motion-compensated frame rate up-conversion," Digest of Technical Papers International Conference on Consumer Electronics, Jan. 10-14, 2009) (Year: 2009).
Huang Chun-Rong et al, 'Maximum a Posteriori Probability Estimation for Online Surveillance Video Synopsis', IEEE Transactions on Circuits and Systems for Video Technology, IEEE Service Center, Piscataway, NJ, US, vol. 24, No. 8, doi:10.1109/TCSVT.2014.2308603, ISSN 1051-8215, (Aug. 1, 2014), pp. 1417-1429, (Aug. 1, 2014), XP011555234.
Jakubowski M., et aL, 'Block-based motion estimation algorithmsa survey,' Opto-Eiectronics Review 21, No. 1 (2013), pp. 88-102.
Kaur, M., et al., 'A Review on Digital Watermarkign Using LSB', International Journal of Advanced Research In Computer Science and Software Engineering, Nov. 2005, vol. 5, Issue 11, pp. 1210-1214.
Kendall A., et al., 'Bayesian Segnet: Model Uncertainty in Deep Convolutional Encoder-Decoder Architectures for Scene Understanding,' arXiv: 1511.02680, 2015. (11 pages).
Lars Schnyder et al, 'Depth image based compositing for stereo 3D', 3DTV—Conference: The True Vision—Capture, Transmission and Display of 3D Video (3DTV—Con), 2012, IEEE, (Oct. 15, 2012), doi:10.1109/3DTV.2012.6365451, ISBN 978-1-4673-4904-8, pp. 1-4, XP032275894.
Lee et al. ("Video frame rate conversion for mobile devices," Electronic Imaging 2005, Proceedings vol. 5684, Multimedia on Mobile Devices, Mar. 11, 2005) (Year: 2005).
Liu et al. ("Motion vector refinement for frame rate up conversion on 3D video," Visual Communications and Image Processing VCIP), Nov. 17-20, 2013) (Year: 2013).
Lowe D.G., 'Object Recognition From Local Scale-invariant Features,' Computer vision, The proceedings of the seventh IEEE international conference on 1999, vol. 2, pp. 1150-1157.
Mitzel D., et al., 'Video Super Resolution Using Duality Based TV-I1 Optical Flow,' Joint Pattern Recognition Symposium, 2009, pp. 432-441.
Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schnyder L., et al., '2D to 3D Conversion of Sports Content using Panoramas,' Image Processing (ICIP), 2011, IEEE, pp. 1961-1964.
Schwartz, E., et al., "Implementation of Compression with Reversible Embedded Wavelets," In Proc. SPIE, 1995, 12 pages.
Shannon, 'A Mathematical Theory of Communication', Bell Syst. Tech. J., 27:379-423, 623-656, 1948.
Suzuki et al., 'Inter Frame Coding with Template Matching Averaging,' in IEEE international Conference on Image Processing Proceedings (2007), vol. (iII), pp. 409-412.
Szeliski R., "Computer Vision: Algorithms and Applications," Springer Science & Business Media, 2010, 979 pages.
Szeliski, et al., "Fast Poisson blending using Multi-Splines." Computational Photography (ICCP), 2011 IEEE International Conference. (8 pages).
Tai et al. ("A Multi-Pass True Motion Estimation Scheme With Motion Vector Propagation for Frame Rate Up-Conversion Applications," Journal of Display Technology, vol. 4, No. 2, Jun. 2008) (Year: 2008).
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Tonci F. et al., 'Buffer Constraints for Rate-Distortion Optimization in Mobile Video Communications', Proceedings of International Symph on Signals, Circuits and Systems, Jul. 2005, pp. 71-74, Lasi, Romania (Invited Paper).
Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.
Wadhwa, et al., "Phase-Based Video Motion Processing", ACM Transactions on Graphics (TOG) 32.4 (2013): 80. (3 pages).
Wang et al. ("Video frame rate up conversion using region based motion compensation," IEEE Electro/Information Technology Conference, Aug. 26-27, 2004) (Year: 2004).
Weinzaepfel, et al., "Deepflow: Large displacement optical flow with deep matching", Proceedings of the IEEE International Conference on Computer Vision, 2013. (8 pages).
Xiao, et al., 'Multiple View Semantic Segmentation for Street View Images,' 2009 IEEE 12th International Conference on Computer Vision, 2009, pp. 686-693.
Xiong Y et ai 'Gradient Domain Image Blending and Implementation on Mobile Devices,' International Conference on Mobile Computing, Applications, and Services, Springer Berlin Heidelberg, 2009, pp. 293-306.

(56) References Cited

OTHER PUBLICATIONS

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

* cited by examiner

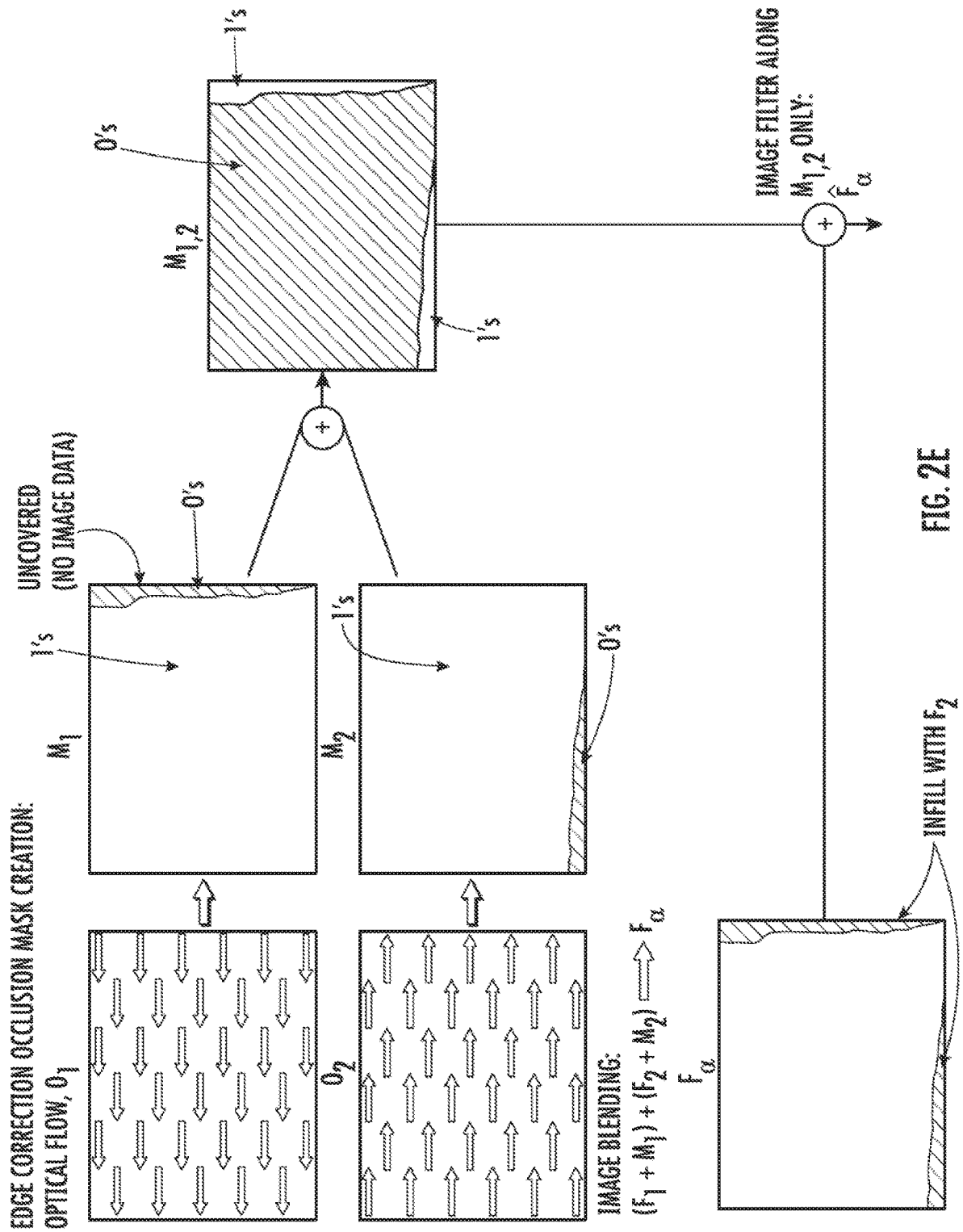

APPARATUS AND METHODS FOR ARTIFACT DETECTION AND REMOVAL USING FRAME INTERPOLATION TECHNIQUES

PRIORITY

This application is a divisional of and claims the benefit of priority to co-owned U.S. patent application Ser. No. 15/583,794 filed May 1, 2017, issued as U.S. Pat. No. 10,489,897, and entitled "APPARATUS AND METHODS FOR ARTIFACT DETECTION AND REMOVAL USING FRAME INTERPOLATION TECHNIQUES", the foregoing being incorporated herein by reference in its entirety.

RELATED APPLICATIONS

This application is related to co-owned and co-pending U.S. patent application Ser. No. 15/407,089 filed Jan. 16, 2017, issued as U.S. Pat. No. 10,057,538, and entitled "Apparatus and Methods for the Selection of One or More Frame Interpolation Techniques", the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image post-processing and in one exemplary aspect, to methods and apparatus for the detecting and removal of artifacts from generated interpolated frames of data.

Description of Related Art

Frame interpolation is a common post-processing technology that enables, for example, modern display devices to increase the perceived framerate of natively captured video data. In general, frame interpolation algorithms include a two-step process that includes a motion interpolation block and a frame blending block. For example, frame interpolation techniques enable the ability to take into account the motion of pixels on the frames of video data by analyzing the spatial relationship between pixels in the initial and subsequent frame. By taking into consideration this motion of pixels, an intermediate frame may be generated that utilizes information contained within the natively captured adjacent frames. Similarly, the frame blending block generates an intermediate frame of data by interpolating, for example, the color of pixels contained within these natively captured adjacent frames.

However, a high degree of accuracy for the produced intermediate frame requires a high degree of accuracy in the motion interpolation block. Accordingly, inaccurate pixel correspondences lead to inaccurate motion estimations resulting in low quality or distorted interpolated frames. Accordingly, techniques are needed to improve upon these frame interpolation techniques, and improve upon motion estimation calculations for the motion interpolation block in order to enable, for example, modern display devices to perform to their capabilities when displaying video content that was natively captured at, for example, lesser frame rates.

SUMMARY

The present disclosure satisfies the foregoing needs by providing, inter alia, methods and apparatus for the detection and removal of artifacts from generated interpolated frames.

In a first aspect of the present disclosure, a computerized apparatus is disclosed. In one embodiment, the computerized apparatus includes an imaging module; an optical flow module in operative communication with the imaging module; a frame blending module in operative communication with the optical flow module; an edge correction module in operative communication with the frame blending module; a multi-pass module in operative communication with the frame blending module; and a single-pass module in operative communication with the edge correction module.

In one variant, the multi-pass module further includes an optical flow replacement module, the optical flow replacement module configured to replace an optical flow value generated by the optical flow module for the generation of interpolated frames of video data.

In another variant, the multi-pass module further includes a pixel intensity error module, the pixel intensity error module being configured to calculate one or more estimated frames based on a forward and a backward optical flow generated by the optical flow module.

In yet another variant, the multi-pass module further includes a segmentation module, the segmentation module configured to reduce or eliminate artifacts in the generation of interpolated frames of video data by virtue of segmentation of inaccurate optical flow information for use by the optical flow replacement module.

In yet another variant, the multi-pass module further includes a tiling module and a statistics calculation module, the tiling module configured to divide calculated frame errors determined by the pixel intensity error module into a plurality of tiles; and the statistics calculation module is configured to calculate statistical outliers on a per-tile basis of the plurality of tiles.

In yet another variant, the single-pass module further includes: an occlusion mask module which receives as input an output of the optical flow module; a dilation/erosion operations module; and an occlusion mask combiner module, the occlusion mask combiner module configured to output a combined occlusion mask to the edge correction module.

In a second aspect of the present disclosure, a computer readable storage apparatus is disclosed. In one embodiment, the computer readable storage apparatus includes a storage medium, the storage medium including a plurality of computer-executable instructions, the plurality of computer-executable instructions configured to, when executed by a processing apparatus: obtain a pair of frames from a video sequence; determine one or more frame errors for the obtained pair of frames from the video sequence; perform a multi-pass operation and/or perform a single-pass operation; perform frame blending on the obtained pair of frames from the video sequence subsequent to the performance of the multi-pass operation and/or performance of the single-pass operation; and generate an interpolated frame subsequent to the performance of the frame blending.

In one variant, the determination of the one or more frame errors further includes: calculation of a forward and a backward optical flow for the obtained pair of frames from the video sequence; calculation of a pair of estimated frames based on the calculated forward and backward optical flows; and calculation of one or more frame errors for the obtained pair of frames from the video sequence based at least in part on the calculated pair of estimated frames.

In another variant, the performance of the multi-pass operation further includes: division of the calculated one or more frame errors into a plurality of tiles; calculation of statistical outliers on a per-tile basis based at least in part on the division; and determination of whether the calculated statistical outliers exceeds a threshold value on the per-tile basis.

In yet another variant, the performance of the multi-pass operation further includes: calculation of an updated optical flow for a given tile of the plurality of tiles; performance of a segmentation operation on at least a portion of the calculated statistical outliers; and replace an original optical flow calculation with the calculated updated optical flow for the given tile of the plurality of tiles.

In yet another variant, the performance of the segmentation operation further includes performance of a naïve segmentation operation.

In yet another variant, the performance of the segmentation operation further includes performance of a boundary likelihood cost operation.

In yet another variant, the performance of the single-pass operation further includes: generation of two or more occlusion masks using the calculated forward and backward optical flows; combination of the generated two or more occlusion masks; and performance of edge correction on the generated interpolated frame based at least in part on the combination of the generated two or more occlusion masks.

In a third aspect of the present disclosure, an integrated circuit (IC) apparatus is disclosed. In one embodiment, the IC apparatus is configured to obtain a pair of frames from a video sequence; determine one or more frame errors for the obtained pair of frames from the video sequence; perform a multi-pass operation and/or perform a single-pass operation; perform frame blending on the obtained pair of frames from the video sequence for generation of an interpolated frame; and generate an interpolated frame subsequent to the performance of the frame blending.

In a fourth aspect of the present disclosure, a method for the generation of interpolated frames is disclosed. In one embodiment, the method includes obtaining a pair of frames from a video sequence; determining one or more frame errors for the obtained pair of frames from the video sequence; determining that the determined one or more frame errors exceeds a first threshold value and performing a multi-pass operation and/or performing a single-pass operation; performing frame blending on the obtained pair of frames from the video sequence subsequent to the performance of the multi-pass operation and/or performance of the single-pass operation; and generating an interpolated frame subsequent to the performance of the frame blending.

In one variant, the determining of the one or more frame errors for the obtained pair of frames from the video sequence, further includes: calculating a forward and a backward optical flow for the obtained pair of frames from the video sequence; calculating a pair of estimated frames based on the calculated forward and backward optical flows; and calculating one or more frame errors for the obtained pair of frames from the video sequence based at least in part on the calculated pair of estimated frames.

In another variant, the performance of the multi-pass operation further includes: dividing the calculated one or more frame errors into a plurality of tiles; calculating statistical outliers on a per-tile basis based at least in part on the dividing; and determining whether the calculated statistical outliers exceeds a second threshold value on the per-tile basis.

In yet another variant, the performance of the multi-pass operation further includes: calculating an updated optical flow for a given tile of the plurality of tiles; performing a segmentation operation on at least a portion of the calculated statistical outliers; and replacing an original optical flow calculation with the calculated updated optical flow for the given tile of the plurality of tiles.

In yet another variant, the performance of the segmentation operation further includes performing a naïve segmentation operation.

In yet another variant, the performance of the segmentation operation further includes performing a boundary likelihood cost operation.

In yet another variant, the performance of the single-pass operation further includes: generating two or more occlusion masks using the calculated forward and backward optical flows; combining the generated two or more occlusion masks; and performing edge correction on the generated interpolated frame based at least in part on the combination of the generated two or more occlusion masks.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

FIG. 2E is a logical flow diagram of an exemplary method for performing edge correction, in accordance with the principles of the present disclosure.

Figure 1:
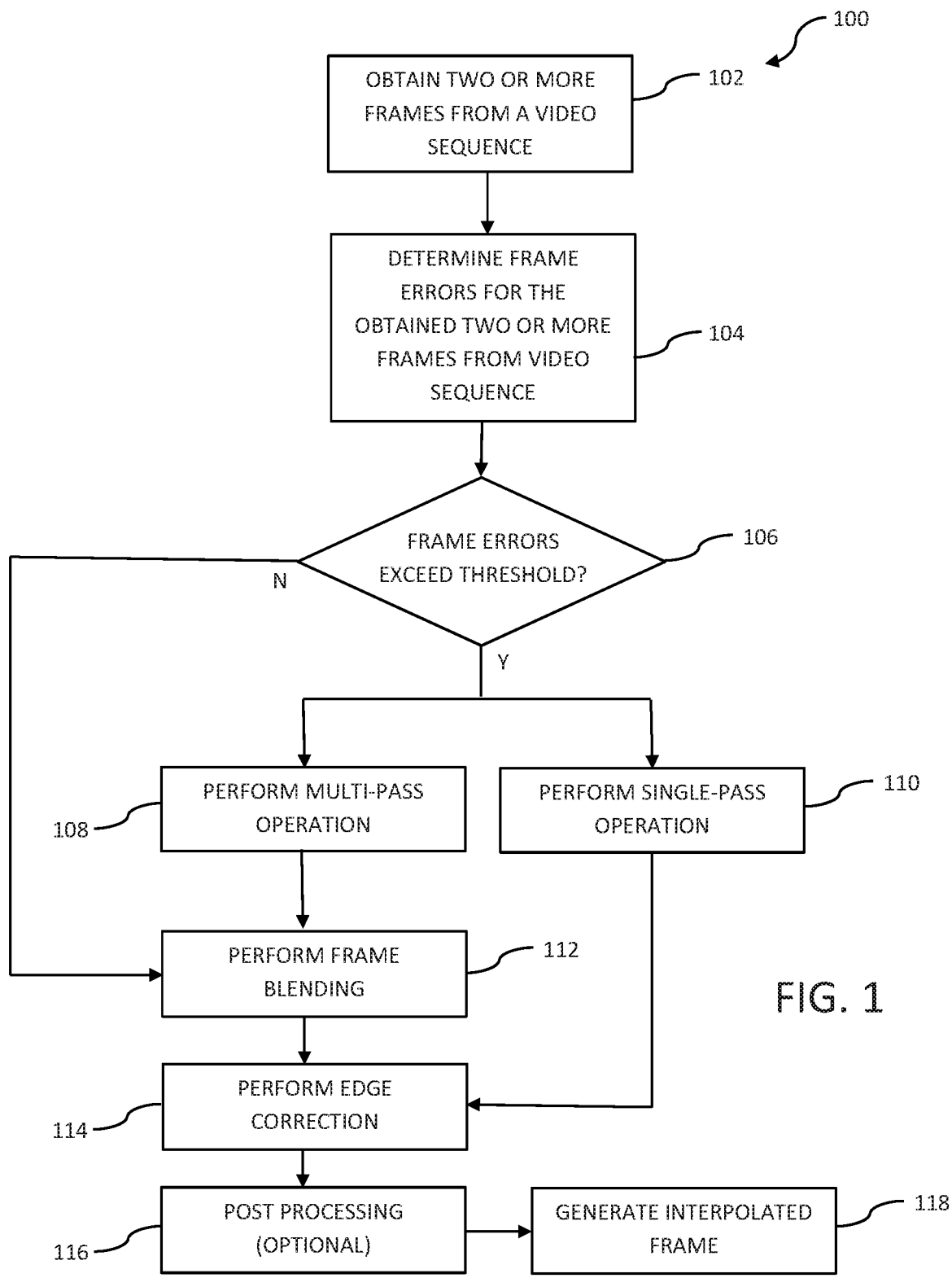
FIG. 1 is a logical flow diagram of a generalized method for generating interpolated frames of video data, in accordance with the principles of the present disclosure.

All Figures disclosed herein are © Copyright 2017 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Methods and apparatus for the detection and removal of artifacts from generated interpolated frames are provided herein. As a brief aside, frame interpolation takes, for example, two frames ($F_1$, $F_2$) as input and outputs one or more interpolated frames ($F_I$) which lie in between the two frames ($F_1$, $F_2$). Moreover, the precise positioning of the interpolated frame ($F_I$) may be dependent upon a value alpha ($\alpha$). Alpha ($\alpha$) represents, inter alia, the amount the video should slow down as, for example, a decimal value between zero and one. For example, if one wants to slow down a video sequence (or portions thereof) by twice the natively captured frame rate, one would select a value of alpha ($\alpha$) of 0.5 (e.g., by transforming a video segment natively captured at 30 frames per second (fps) into a 60 fps sequence of frames). As but another example, if one wants to slow down the video sequence (or portions thereof) by four times the natively captured frame rate, one would select a value of alpha ($\alpha$) of 0.25 (e.g., from 30 fps into a 120 fps sequence of frames).

As discussed elsewhere herein, frame interpolation algorithms generally include a two-step process that include a motion interpolation block and a frame blending block. The motion interpolation block may be based on, for example, the Lagrangian method (e.g., optical flow) which estimates a pixel's (or group of pixels') motion over time, or the Eulerian method (e.g., phase-based motion estimation) which estimates a pixel's (or group of pixels') color change over time. As a result, the motion interpolation block outputs an intermediate frame for a pixel which contains a pixel coordinate (e.g., Cartesian coordinate, Polar coordinate, and/or other types of coordinate systems) that is based on, for example, the original two input images ($F_1$, $F_2$). The frame blending block interpolates the color from ($F_1$, $F_2$) based on the intermediate frame generated by the motion interpolation block. This blending may be a linear blending (e.g., a weighted average $F_I=(1-\alpha)F_1+\alpha F_2$)) or a non-linear function such as gradient domain image blending described in, for example, Xiong, Yingen, and Kari Pullie. "Gradient domain image blending and implementation on mobile devices." International Conference on Mobile Computing, Applications, and Services. Springer Berlin Heidelberg, 2009, or Poisson blending, such as that described in Szeliski, Richard, Matthew Uyttendaele, and Drew Steedly. "Fast Poisson blending using multi-splines." Computational Photography (ICCP), 2011 IEEE International Conference on. IEEE, 2011, each of the foregoing incorporated herein by reference in its entirety.

Exemplary Interpolation Methodologies

The processes described herein may be performed by a computerized device or system (such as, for example, the computing device 300 of FIG. 3) having at least one processor and a non-transitory computer-readable storage apparatus having a storage medium. The storage medium may store a number of computer-executable instructions thereon, that when executed by the at least one processor, cause the at least one processor to perform the following methodologies (or portions thereof) described herein. The various methodologies described herein are useful in, for example, the interpolation, storage, transmission and/or reception of this captured video data.

Additionally, the processes described herein (or portions thereof) may be performed by dedicated computerized system logic including, without limitation, application-specific integrated circuits (ASICs), field-programmable gate arrays (FPGAs), and/or other types of integrated circuits or dedicated computerized logic that may be utilized in addition to, or alternatively from, the aforementioned computer-readable storage apparatus.

Referring now to FIG. 1, a generalized methodology 100 for generating interpolated frames of video data that identifies and corrects artifacts associated with the frame interpolation process is shown. As a brief aside, in order to achieve a high quality interpolated frame of video data, the motion interpolation algorithms, such as those described in co-owned and co-pending U.S. patent application Ser. No. 15/407,089 filed Jan. 16, 2017 and entitled "Apparatus and Methods for the Selection of One or More Frame Interpolation Techniques", the contents of which were previously incorporated herein by reference in its entirety, require accuracy and precision. Common techniques which utilize motion interpolation algorithms in order to calculate, for example, optical flow of pixels and/or objects within a frame of video data may fail or otherwise become inaccurate due to one or more factors including, for example: an object's large pixel displacement and/or "shaky" or other fast motions for the image capture device (e.g., a video camera) and the like. As a result, inaccurate optical flows calculated using extant motion interpolation algorithms may lead to artifacts being present within these interpolated image frames.

In other words, artifacts tend to be inherent in many common frame interpolation algorithms and may be caused by different failures or inaccuracies that may cascade throughout the entire frame interpolation algorithm. The artifacts may include, but are not limited to: double images of the same object (e.g., ghosting); blurry image edges; and lost imaging details associated with objects in the interpolated frame. Additionally, these artifacts may be difficult to predict as they tend to develop over time. The algorithm 100 described subsequently herein is intended to address these frame interpolation algorithm inaccuracies.

At operation 102 of methodology 100, two or more frames from a video sequence may be obtained. These frames of data may be obtained directly via, for example, an image capture device (e.g., a video camera), or alternatively may be obtained indirectly from, for example, a computer-readable apparatus (e.g., a hard drive and/or other forms of memory). In some implementations, each of these obtained frames may include natively captured content (i.e., frames of video data directly captured by an image capturing device). In some implementations, one (or more) of the obtained frames may include a previously generated interpolated frame, such as a generated interpolated frame using the processes or apparatuses described herein, while the other one of the obtained frames may include a natively captured frame. In yet other implementations, two (or more) of the obtained frames of video data may include previously generated interpolated frames of video data using, for example, the processes or apparatuses as described herein.

At operation 104, frame errors for the obtained two or more frames from a video sequence are determined. For example, in some implementations that utilize two frames of data obtained at operation 102, it may be desirable to calculate the forward and backward optical flows for the two frames of data and calculate the estimated frames based on the calculated optical flows. In other words, given two frames $F_1$ and $F_2$ and using the forward and backward optical flow calculations, one may determine $F_{1est}$ and $F_{2est}$. Using these estimated frames, a comparison may be made with the actual two frames $F_1$ and $F_2$ in order to determine frame errors associated with the optical flow calculation. See also, for example, the methodology described subsequently herein with regards to FIG. 2A. In some implementations, higher order optical flow calculations may be performed on three or more sets of frames. In some instances, these higher order optical flow calculations provide for, for example, more accurate motion estimation of one or more pixels (or objects) in the generated interpolated frames. For example, by accurately tracking the motion of pixels through three or more sets of frames, a more accurate interpolation of accelerating/decelerating pixel (object) motion may be determined.

At operation 106, the determined frame errors are compared against a threshold value parameter to determine whether or not the number of frame errors exceeds this threshold value. This threshold value may be selected as a static value (i.e., does not change over a given length of time), or may be selected as a dynamic value that varies as a function of, for example, time. Regardless of the type of threshold value chosen (i.e., static or dynamic), the value that may be ultimately entered into the threshold value parameter may take into consideration, for example, the available processing resources for the computing device (such as, e.g., the computing device 300 illustrated in FIG. 3), available bandwidth considerations for data transmission/reception for the interpolated/non-interpolated frames, and/or latency considerations associated with, for example, real-time playback of video content. For example, in a computing device that has a relatively high amount of processing resources available to it, it may be desirable to lower the threshold value parameter as compared with, for example, a computing device that has a lower amount of processing resources. Accordingly, by lowering the value of the threshold value parameter, more incremental frame errors may be processed through the multi-pass operation at operation 108 and/or the single-pass operation at operation 110, resulting in more accurate (higher precision) interpolated frames. If the determination at operation 106 is "no", the process advances to the frame blending operation at operation 112. If however, the determination at operation 106 is "yes", the process advances to the multi-pass operation at operation 108 and/or the single-pass operation at operation 110.

As a brief aside, many artifacts in generated interpolated frames occur due to inaccurate optical flow calculations. For example, inaccurate optical flow calculation(s) may be resultant on, for example, small portions of the image where occlusions may uncover a previously hidden area and/or cover a previously known area. Additionally and/or alternatively, artifacts may also appear in these interpolated frames due to, for example, noisy input image frames and/or highly visually complex scenes. Operations 108 and 110, as discussed subsequently herein, describe two such solutions to help eliminate or reduce the noticeability of these introduced artifacts during the frame interpolation process.

At operation 108, a so-called multi-pass operation may be performed. Using the determined frame errors from operation 104, an artifact detection algorithm may be used to identify problematic areas within the optical flow calculation(s). Artifact detection algorithms, such as those described with reference to FIGS. 2B and 2C described subsequently herein, are used to identify problematic areas within the interpolated frame which may lead to introduced artifacts such as, for example, ghosting and/or double imaging artifacts. The multi-pass operation 108 may be used for the segmentation of inaccurate optical flows within the interpolated frame in order to, for example, classify objects within the interpolated frame as either corresponding to foreground objects or background objects. Inaccurate classification of objects as either foreground or background objects may result in, for example, inaccurate optical flow calculations. Apparatus and methodologies for the determination of, for example, foreground or background objects are also described in co-owned and co-pending U.S. patent application Ser. No. 15/251,896 filed Aug. 30, 2016 entitled "Apparatus and Methods for Video Image Post-Processing for Correcting Artifacts", the contents of which being incorporated herein by reference in its entirety.

At operation 110, a so-called single-pass operation may be performed in addition to, or alternatively from, the aforementioned multi-pass operation. In contrast with multi-pass operations performed at operation 108 which may be considered a post-processing image processing step to, for example, correct color values that do not agree with neighboring pixels, the single-pass operation may be considered a methodology that identifies and corrects errors within the interpolated frame using one or more pre-processing image processing operations. These pre-processing steps may be utilized to detect and correct any optical flow determinations which do not agree with neighboring pixels. In some implementations, the performance of single-pass operations at operation 110 may lower the probability of wrong foreground and background classifications for objects within an interpolated frame. Additionally, the performance of single-pass operations may enable the identification of areas within the interpolated frame where objects which may be present in one of the initial frames may not be present in other one(s) of the initial frames to be interpolated.

A variety of combinations of the aforementioned single-pass and/or multi-pass operations may be utilized in order to, for example, reduce artifacts present within an interpolated frame. For example, a single-pass operation 110 may work adequately for many input-image frame pairs; however, when a determined pixel intensity error exceeds a given threshold, the multi-pass operation may be applied in addition to, or alternatively from, the aforementioned single-pass operation. Accordingly, by the intelligent selection of single-pass and/or multi-pass operations, more accurate optical flow calculations for each input image-pair (from, e.g., operation 102) may result in higher quality interpolated frames while simultaneously taking into consideration the aforementioned available processing resources for the computing device (such as, e.g., the computing device 300 illustrated in FIG. 3), available bandwidth considerations for data transmission/reception for the interpolated/non-interpolated frames, and/or latency considerations associated with, for example, real-time playback of video content.

At operation 112, frame blending is performed on the interpolated frame resultant from either the number of frame errors not exceeding a threshold value at operation 106, or from the results from the performed multi-pass operation at operation 108. Frame blending may take into consideration one or more pixel's color (e.g., RGB values, chrominance/luminance values) using, for example, the two input frames ($F_1$, $F_2$). As yet another example, frame blending may take into consideration one or more pixel's color using more than two input frames so as to enable, inter alia, a more accurate estimated interpolated color (i.e., so as to enable higher order interpolated color estimation). This frame blending may involve a linear blending (e.g., a weighted average $F_I = (1-\alpha)F_1 + \alpha F_2$), where a represents an intermediate division of time within the obtained pair of frames where the interpolated frame is being generated) or a non-linear function such as, for example, gradient domain image blending described in, for example, Xiong, Yingen, and Kari Pullie. "Gradient domain image blending and implementation on mobile devices." International Conference on Mobile Computing, Applications, and Services. Springer Berlin Heidelberg, 2009, or Poisson blending, such as that described in Szeliski, Richard, Matthew Uyttendaele, and Drew Steedly. "Fast Poisson blending using multi-splines." Computational Photography (ICCP), 2011 IEEE International Conference on. IEEE, 2011, each of the foregoing incorporated herein by reference in its entirety.

At operation 114, edge correction operations may be performed. In some implementations, occlusion masks for each image in the imaging set (e.g., imaging-pair) are created. An occlusion mask may be a binary mask where each pixel value is labeled if an area is uncovered (e.g., there is no associated color information related to that pixel based on the calculated optical flows). Occlusion masks for the forward and backward optical flows are created, for example, prior to the frame blending step in the overall frame interpolation algorithm. During the frame blending process, the resulting interpolated frame has uncovered areas with no image data associated therewith. The forward and backward occlusion masks may be merged in order to create a combined occlusion mask. The combined occlusion mask may be used to extract the corresponding image data from the interpolated image. The interpolated frame and smoothed temporary image may be combined to create an interpolated frame.

At operation 116, additional post processing operations may be performed including, for example, adjusting exposure settings within the interpolated frame, adjusting white balance settings of the interpolated frame, and/or applying post-processed filtering to the interpolated frame. At operation 118, the interpolated frame is generated.

Figure 2A:
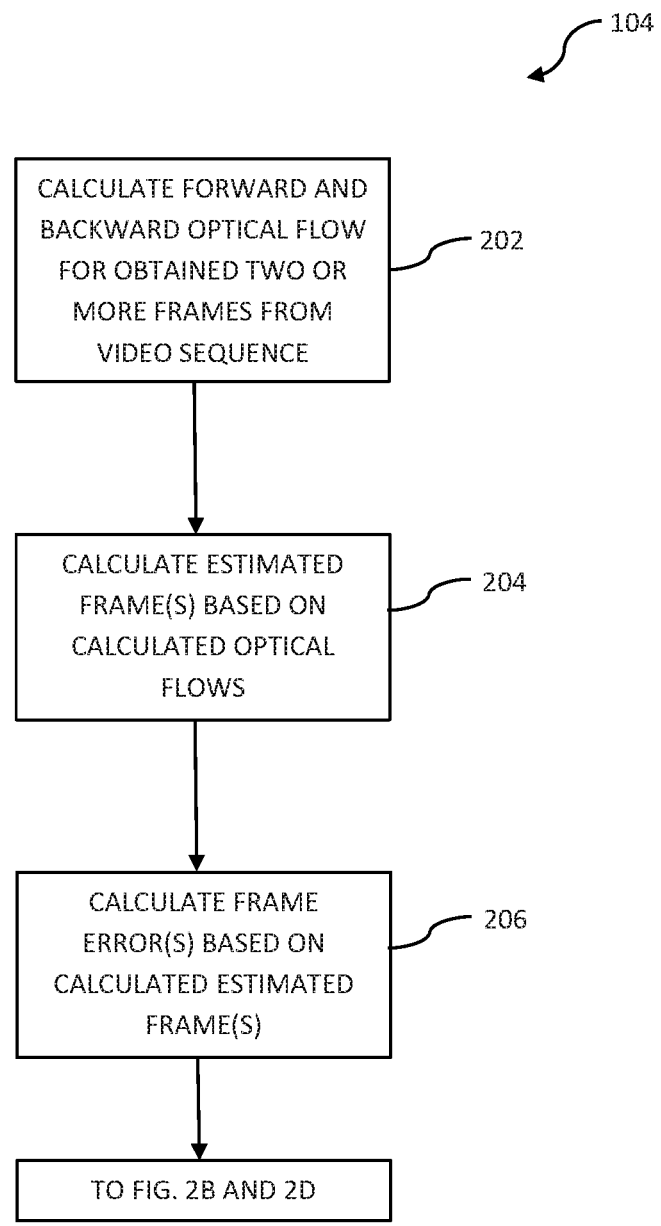
FIG. 2A is a logical flow diagram of an exemplary method for determining frame errors for obtained frames from a video sequence, in accordance with the principles of the present disclosure.

Referring now to FIG. 2A, one exemplary methodology 104 for the determination of frame errors for the obtained two or more frames from a video sequence is illustrated. At operation 202, the forward and backward optical flows for the obtained two or more frames from a video sequence are calculated. For example, in the context of two exemplary input frames $F_1$ and $F_2$, the forward optical flow is calculated from frame $F_1$ to frame $F_2$, while the backward optical flow is calculated from frame $F_2$ to frame $F_1$. As a result of operation 202, two optical flows are generated, namely: the forward optical flow ($O_{1 \rightarrow 2}$) and the backward optical flow ($O_{2 \rightarrow 1}$) are estimated for the input image-pair.

At operation 204, the estimated frames are calculated based on the calculated optical flows from operation 202. For example, and referring back to the example that is in the context of two exemplary input frames $F_1$ and $F_2$, the estimated frames $F_1^{est}$ and $F_2^{est}$ are calculated using equations (1) and (2) as set forth below:

$$F_1^{est} = F_2 + O_{2 \rightarrow 1} \qquad \text{Equation (1)}$$

$$F_2^{est} = F_1 + O_{1 \rightarrow 2} \qquad \text{Equation (2)}$$

In other words, the estimated frame $F_1^{est}$ is calculated as the sum of image frame $F_2$ and the backward optical flow ($O_{2 \rightarrow 1}$) in order to obtain $F_1^{est}$. Similarly, the estimated frame $F_2^{est}$ is calculated as the sum of image frame $F_1$ and the forward optical flow ($O_{1 \rightarrow 2}$) in order to obtain $F_2^{est}$. These estimated frames calculation may not only be performed on a pixel-by-pixel basis, but may even be performed on an object-by-object basis (e.g., when utilizing super pixels such as those described in co-owned and co-pending U.S. patent application Ser. No. 15/251,896 filed Aug. 30, 2016 entitled "Apparatus and Methods for Video Image Post-Processing for Correcting Artifacts", the contents of which being incorporated herein by reference in its entirety). In the context of a pixel-by-pixel estimation given two input frames $F_1$ and $F_2$, for each pixel x in frame $F_1$ and $F_2$, the optical flow $O_i$ is added to that pixel location, i.e., $F_{ix} + O_{ix} = F_{ix}^{est}$ where i=1 or 2 in this instance (i.e., corresponds to either $F_1$ or $F_2$).

At operation 206, the frame error(s) are calculated based on the calculated estimated frame(s). For example, and referring back to the example that is in the context of two exemplary input frames $F_1$ and $F_2$, for each image frame pair, a pixel intensity difference (error) is calculated which is the difference between a starting location pixel color value (e.g., an input frame pixel color value) and an end location pixel color value (e.g., an estimated frame pixel color value). The frame error(s) (e.g., the pixel intensity difference) are calculated using equations (3) and (4) as set forth below:

$$F_1^{diff} = F_1 - F_1^{est} \qquad \text{Equation (3)}$$

$$F_2^{diff} = F_2 - F_2^{est} \qquad \text{Equation (4)}$$

In other words, the frame error $F_1^{diff}$ is calculated by subtracting the estimated color of a given pixel in frame $F_1^{est}$ from the actual color of the given pixel in frame $F_1$. Similarly, the frame error $F_2^{diff}$ is calculated by subtracting the estimated frame $F_2^{est}$ from the actual frame $F_2$.

Figure 2B:
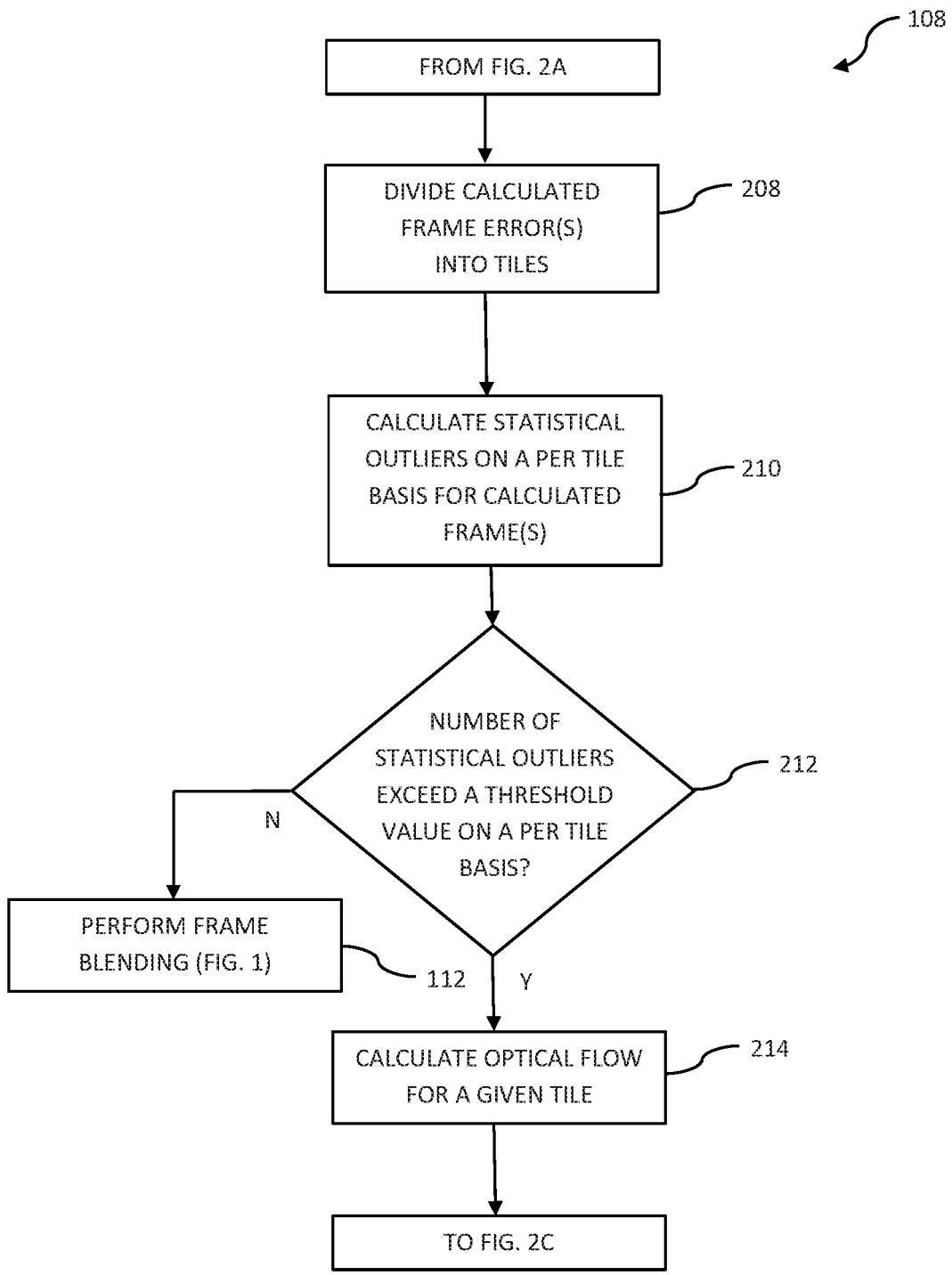
FIGS. 2B and 2C are logical flow diagrams of an exemplary method for performing a multi-pass operation for the removal of artifacts from an interpolated frame of data, in accordance with the principles of the present disclosure.
Figure 2C:
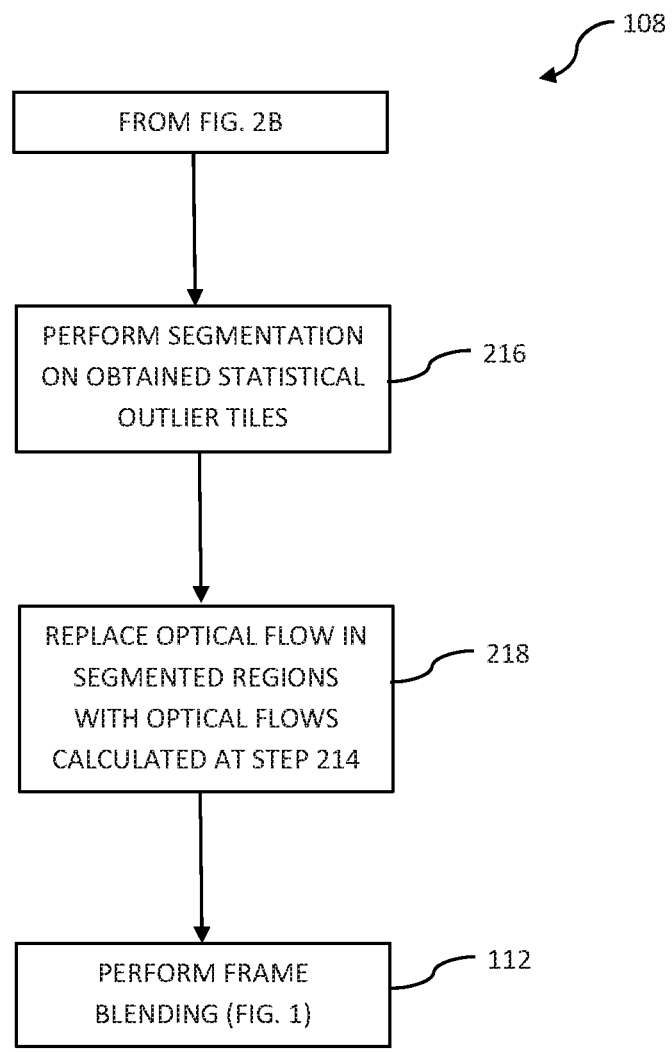

Referring now to FIGS. 2B and 2C, an exemplary multi-pass operation 108 is shown and described in detail. At operation 208, the calculated frame error(s) are divided into segments (e.g., tiles). In some implementations, the sizes of these segments/tiles may be of a predetermined size (e.g., consisting of a 256 pixel by 256 pixel tile). For example, the tile size selected may be optimized for, for example, dedicated hardware used with the computing device. More generally, frame error $F_1^{diff}$ and $F_2^{diff}$ are tiled with X rows and Y columns. The values X and Y may be equal to one another, or alternatively may be of different values. In some implementations, the values for X and Y are dynamically selected based on the image resolution of the frame. For example, tile sizes may be a power of two (2) for the purposes of optimization. If the image resolution is not a power of two (2), then a portion (e.g., a majority portion) of the tiles could be set to a power of two (2) with a leftover portion of the pixels being grouped into potentially sub-optimal tile sizes (e.g., that are not a power of two (2)).

At operation 210, for each (X, Y) pair (or tile), each pixel is classified based on its respective value within frame error $F_1^{diff}$ and/or $F_2^{diff}$. For example, in some implementations, each pixel within a given (X, Y) pair (or tile) will be determined with regards to a quartile calculation (e.g., top 25%, bottom 25%, and two middle 25% quartiles). In other words, the quartile calculations specify four quartiles representing four equal groups into which a population can be divided per the distribution of values of a variable along with the statistical outliers. The statistical outliers are those errors that lie outside of a given population distribution and correspond to, for example, errors that are different in pixel color which in turn may correlate to inaccurate optical flow for these pixels. While cast primarily in terms of quartile calculations, it would be readily apparent to one of ordinary skill given the contents of the present disclosure that other types of quantile measurements may readily be used in place of the aforementioned quartiles, including median, tertiles, quintiles, sextiles, septiles, octiles, deciles and/or other types of quantile values. For example, where available processing resources are available for generating interpolated frames of video data, it may be desirable to correct inaccurate optical flows for the top 25% and bottom 25% for a given quartile calculation. As but yet another example, it may be desirable to correct inaccurate optical flows for the top 10% for a given decile calculation where, for example, processing resources are more limited. These and other variations would be readily apparent to one of ordinary skill given the contents of the present disclosure.

At operation 212, the number of statistical outliers within a given tile are compared against a threshold value on a per tile basis. If the number of statistical outliers does not exceed a given threshold, the process may advance to operation 112 where frame blending operations are performed as discussed elsewhere herein. If however, the number of statistical outliers exceeds a threshold value on a per tile basis, the process may advance to operation 214, and the optical flow may be recalculated on, for example, a per tile basis.

Referring now to FIG. 2C, at operation 216 a segmentation calculation may be performed on, for example, the obtained statistical outlier tiles from operation 212. In some implementations, the segmentation calculation may be performed according to a so-called naïve segmentation approach. As a brief aside, trying to segment the foreground objects from background objects may tend to be a very difficult process due to, inter alia, image capture device (e.g., video camera) movement, the relative size of the foreground objects as compared with the background objects (e.g., the foreground object may be small as compared with the background object(s)), and/or the foreground object color scheme may be similar to the background color scheme. The so-called naïve segmentation approach may not be used so much for object classification (e.g., determining foreground and background objects), but rather may instead classify clusters of similar color with the usage of Super Pixels. The calculated Super Pixels associated with the outliers determined at operation 212 may be independently surrounded with a minimum bounding box and the optical flow algorithm operation at operation 214 may be performed within these local minimum bounding boxes.

In some implementations, operation 216 may use a so-called boundary likelihood cost function in order to perform segmentation. The boundary likelihood cost function approach may be a more robust solution for classifying objects (e.g., determining foreground and background objects), as compared with the naïve segmentation approach. The boundary likelihood cost function may identify whether a given pixel p belongs to a neighborhood patch N that may, for example, exhibit a moving foreground element over the background image. By identifying these regions within the image, the algorithm enables one to refine or substitute alternative flow algorithms to improve the flow field along these boundary areas (i.e., between foreground and background objects). For example, given a frame pair $F_1$ and $F_2$, the optical flow field O is evaluated for this given pair of frames. The optical flow field for a given pixel p will be denoted O(p) that takes the given pixel p in $F_1$ to the corresponding pixel q in $F_2$. A constellation s of k points $\{s_1, \ldots, s_k\}$ in the local image plane neighborhood of pixel p is picked. In addition, we may pick the same constellation d of k points $\{d_1, \ldots, d_k\}$ in the local image plane neighborhood of pixel q. The precise constellation s, d and the number of points k may vary in some implementations. Accordingly, the boundary likelihood cost function B may be defined by equation (5) as set forth below, where g( ) is the function that maps a constellation point to the domain where we wish to perform the difference comparison e.g. color domain, and $w_i$ is the weighing factor that determines the importance of constellation point $s_i$.

$$B = \frac{1}{k}\sum_{i=0}^{k} w_i(g(s_i) - g(d_i))(g(s_i) - g(d_i))$$ Equation (5)

For example, weighing factor $w_i$, may be constructed based on the distance of the constellation point s to p in the spatial and/or intensity/color domain. Accordingly, one may classify foreground and background objects based on the value of cost function B. For example, B has the behavior of having a low value when both p and its local neighborhood belong to the foreground. Similarly, B has a low value when both p and its local neighborhood belong to the background. However, B becomes high when p lies close to the boundary of a foreground element that is moving over a background object that is locally non-uniform in, for example, texture and color. Similarly, if the optical flow O(p) is inaccurate, there is a high probability that B also becomes high. Accordingly, using a threshold value with the value B may be used to identify regions that require further improvement. For both approaches (i.e., naïve segmentation and boundary likelihood cost function), at step 218, the optical flow within either or both of these segmentation approaches may be replaced with the optical flows calculated at operation 214, and frame blending with these refined optical flows may be performed at operation 112.

Figure 2D:
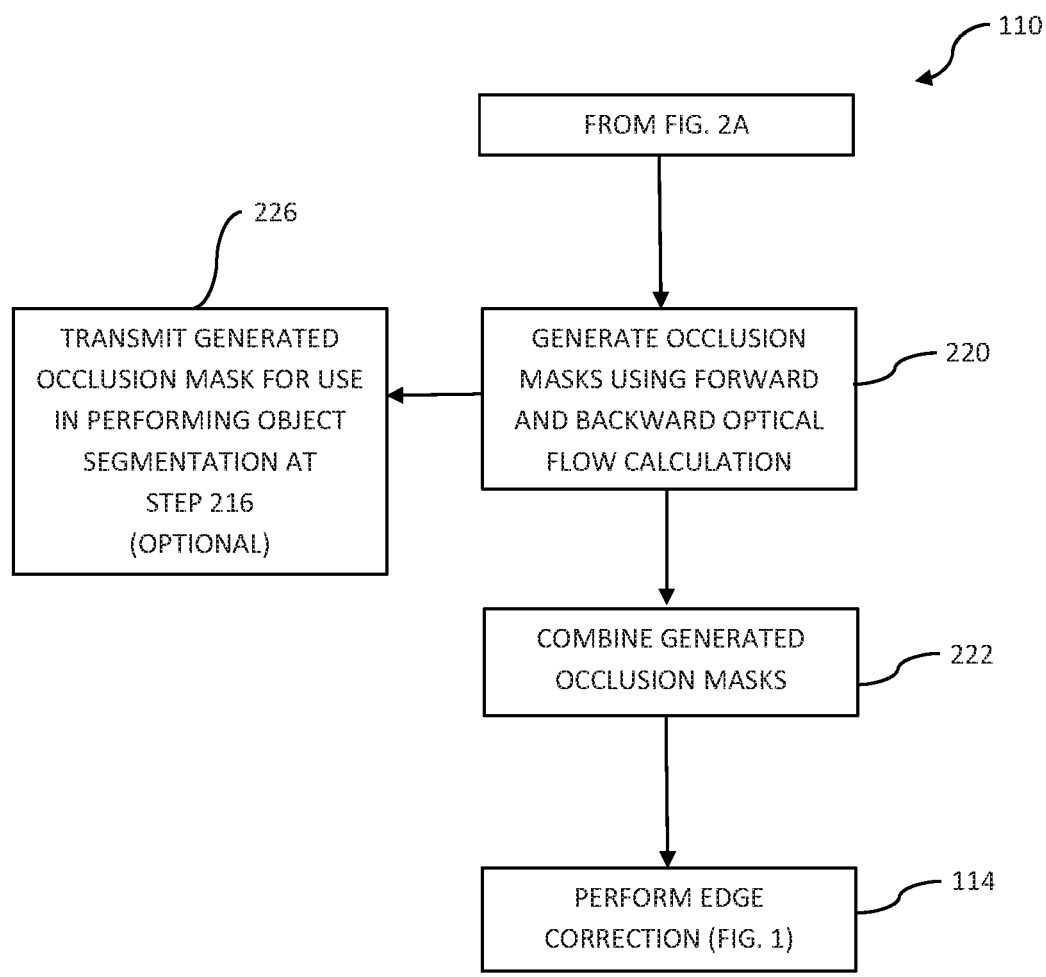
FIG. 2D is a logical flow diagram of an exemplary method for performing a single-pass operation for the removal of artifacts from an interpolated frame of data, in accordance with the principles of the present disclosure.

Referring now to FIGS. 2D and 2E, one exemplary methodology 110 for performing a single pass operation may be performed. At operation 220, occlusion masks using forward and backward optical flow calculations using two or more frames may be generated. For example, areas/objects that may not be present in frame $F_1$, but are present in frame $F_2$ may be determined. This may be due to either image capture device motion (e.g., panning left, panning right, etc.), movement of objects into or out of adjacent frames, as well as background objects being covered by foreground objects, etc. At operation 226, these generated occlusion masks may optionally be transmitted for use with assisting in performing object segmentation as discussed previously herein at operation 216. At operation 222, the generated occlusion masks for the input frames may be combined. Accordingly, by detecting when an object/area is only present within, for example, one frame of the two or more input frames for which frame interpolation is being generated, these objects/areas may be in painted so as to avoid the introduction of artifacts during interpolation generation.

At operation 114, edge correction may be performed. For example, given a sequence of frames of natively captured video, starting at frame 10 and ending on frame 11, it may be desirable to interpolate between these frames at an α of 0.1 (e.g., performing a 10× slow down on the captured frames of a video sequence), resulting in interpolated frames 10.1, 10.2, 10.3, . . . , 10.8, and 10.9. Accordingly, given an image capture device (e.g., a video camera that is panning to the left), it may be expected that as the value from frame 10 approaches frame 11 (e.g., frame 10.9); the amount of uncovered area may be quite large. For example, given a 720p image resolution image capture device, the number of pixel columns on the right side of the image may increase by 10-12 columns as but one example. Conversely, at interpolated frame 10.1, the amount of uncovered area may be quite small (e.g., given a 720p image resolution image capture device, the number of columns on the right side of the image may only be 1 column). Accordingly, by taking into consideration the areas/objects of the image that may be present in one of the initial frames, the introduction of artifacts in the interpolated frames may be reduced.

One such generalized methodology for performing edge correction is set forth below. The first step in correcting edge artifacts is to create the occlusion masks for each image in the imaging set (e.g., imaging-pair). An occlusion mask is a binary mask where each pixel value is labeled if an area is uncovered (i.e., no associated color information related to that pixel based on the calculated optical flows). Occlusion masks for the forward and backward optical flows may be created before the frame blending step in the overall frame interpolation algorithm. During the frame blending process, the resulting interpolated frame has uncovered areas with no image data associated therewith. Accordingly, the second step is to merge the forward and backward occlusion masks to create a combined occlusion mask. The third step may use the combined occlusion mask to extract the corresponding image data from the interpolated image. In other words, a temporary image is created by multiplying the occlusion mask by the interpolated image and then filtering (e.g., median filter, bilateral filter, and the like) is performed on the temporary image to smooth the inconsistent colors. The final step is to combine the interpolated frame and smoothed temporary image to create an interpolated frame that does not have any "holes" or other missing image data along, for example, the edges.

Exemplary Apparatus

Figure 3:
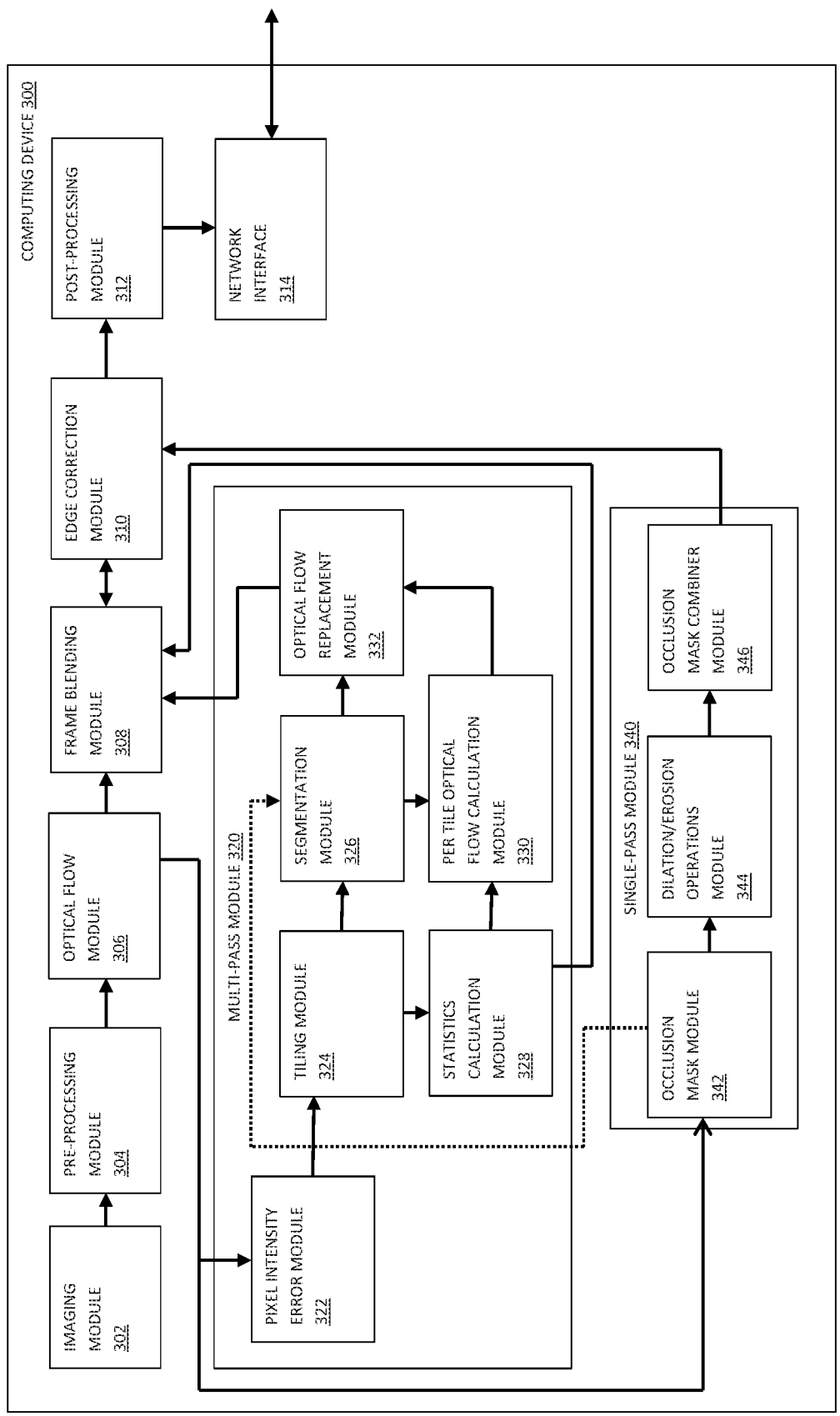
FIG. 3 is a block diagram of an exemplary implementation of a computing device, useful in performing the methodologies described herein.

FIG. 3 is a block diagram illustrating an embodiment of a computing device 300, in accordance with the principles described herein. Specifically, the computing device 300 illustrated in FIG. 3 is adapted to perform the methodologies described with reference to FIG. 1 (and FIGS. 2A-2D) as described herein. The various modules described herein may include hardware components, software components, and/or combinations of the foregoing. The use of the term "module" as used herein is not intended to denote a particular implementation (unless explicitly stated otherwise), but rather is intended to denote the functions implemented by various components of the computing device.

The computing device 300 of the embodiment of FIG. 3 may include an imaging module 302. In some implementations, the imagine module 302 may include one or more imaging sensors. For example, in some implementations, the imaging module 302 may include only a single imaging sensor for the capture of, for example, non-panoramic imaging content. In some implementations, the imaging module 302 may include two (or more) imaging sensors. For example, in some implementations the imaging module 302 may include two imaging sensors arranged in a back-to-back configuration (e.g., Janus configuration). In some implementations, the imaging module 302 may include no imaging sensors, and may instead include memory (e.g., a hard drive or other types of memory) that may instead store images captured by a separate image capturing device. The imaging sensor(s) are configured to convert light incident upon the image sensor chip into electrical signals representative of the light incident upon the image sensor. Such a process is referred to as "capturing" image or video data, and capturing image data representative of an image is referred to as "capturing an image" or "capturing a frame". The image sensor may be configured to capture images at one or more frame rates, and may be configured to capture an image in a first interval of time and then wait a second interval of time before capturing another image (during which no image data is captured). The image sensor may include a charge-coupled device ("CCD") image sensor, a complementary metal-oxide semiconductor ("CMOS") image sensor, or any other suitable image sensor configured to convert captured light incident upon the image sensor chip into image data. Moreover, while implementations of the imaging module 302 is illustrated as forming part of the computing device 300, it is appreciated that in one or more other implementations, image sensor(s) (and/or memory for image storage) may be located remote from computing device 300 (such as via a camera) and instead, images captured via the image sensor may be communicated to the computing device via, for example, the network interface module 314.

The pre-processing module 304 may be configured to perform various pre-processing steps on the image data captured and/or stored by imaging module 302. For example, pre-processing module 304 may be configured to, for example, adjust the brightness and/or contrast (such as, for example, via the algorithms and mechanisms described within co-owned and co-pending U.S. patent application Ser. No. 15/467,730 filed Mar. 23, 2017 and entitled "Apparatus and Methods for Source Dynamic Range Processing of Panoramic Content", the contents of which being incorporated herein by reference in its entirety), noise removal, contrast enhancement and/or illumination equalization.

The optical flow module 306 may be configured to calculate the forward and backward optical flow for two or more images (whether natively captured or previously interpolated) that are to be interpolated. The optical flow module 306 may also receive as input a designated division of time (e.g., division of time a), or designated divisions of time whether at a common prescribed rate or at a varying prescribed rate. The output of the optical flow module 306 may be transmitted/received at the pixel intensity error module 322, the occlusion mask module 342 and/or the frame blending module 308.

The computing device 300 may also include a multi-pass module 320 and/or a single-pass module 340. The single-pass module 340 may include an occlusion mask module 342, a dilation/erosion operations module 344, and an occlusion mask combiner module 346. The occlusion mask module 342 may output its operations to the dilation/erosion operations module 344 and may also optionally output its operations for use in the segmentation module 326. The single-pass module 340 may be configured to perform the methodology of, for example, FIG. 2D.

The multi-pass module 320 may include a pixel intensity error module 322. The pixel intensity error module 322 may be configured to calculate estimated frame(s) based on the calculated optical flows as well as to calculate frame error(s) based on the calculated estimated frame(s). The pixel intensity error module 322 may also determine whether or not it should pass on an output to the tiling module 324. The tiling module 324 may be configured to divide the calculated frame error(s) into tiles. These tiles may be of uniform size or may alternatively, be of non-uniform size. These tiles may also be sized in accordance with other parameters such as, without limitation: number, size and/or location of frame error(s) within the calculated frame error(s); resolution of the obtained frames from the imaging module 302; and/or other imaging considerations. The output of the tiling module 324 may be transmitted/received to the statistics calculation module 328 and the segmentation module 326. The tiling module 324 may also iteratively process, for example, tile sizes. For example, in some implementations, an initial tiling size may prove non-ideal, and the initial tiling size may be increased or decreased.

The segmentation module 326 may be configured to reduce or eliminate artifacts by, inter alia, segmenting the probability/presence of inaccurate optical flow information data. In some implementations, the segmentation module 326 may be configured to perform a naïve segmentation methodology and/or may be configured to perform a boundary likelihood cost function methodology as described supra. For example, in some implementations both methodologies may be performed and the accuracy of the interpolated frames for both of these methodologies may be compared, and the more accurate methodology may be selected. The segmentation module 326 may also take as input, outputs from the occlusion mask module 342 to assist with the determination of, for example, foreground and background objects. The segmentation module 326 may also transmit data to the optical flow replacement module 332.

The statistics calculation module 328 may be configured to calculate statistical outliers on a per tile basis for the calculated frame(s). The statistics calculation module 328 may also determine the number of statistical outliers that exceed a threshold value on a per tile basis. The output of the statistics calculation module may output directly to the frame blending module 308, or may output to the per tile optical flow calculation module 330. The per tile optical flow calculation module 330 may perform an updated optical flow calculation. The per tile optical flow calculation module 330 may also be in data communication with the segmentation module 326 in order to determine the type of revised optical flow calculation necessary. The optical flow replacement module 332 may replace the optical flow calculated using the optical flow module 306 with the revised optical flow calculation performed by the per tile optical flow calculation module.

The frame blending module 308 may be configured to blend the two or more input frames in order to produce one or more interpolated frame(s) and pass these one or more interpolated frame(s) to the edge correction module 310. The edge correction module 310 may apply corrections to the interpolated frame(s) in order to, inter alia, correct for areas/objects that are only present within, for example, a single one of the two or more input frames. In some implementations, occlusion masks that have been created (e.g., in edge correction module 310) may be passed to the frame blending module 308. The post-processing module 312 may apply a number of post-processing calculations to the corrected interpolated frames including, without limitation, adjusting exposure settings for the interpolated frame(s), white balancing the interpolated frame(s), and/or applying post-processing imaging filters.

The network interface module 314 may allow a user of the computing device 300 to perform the various processing steps associated with the methodologies described herein. For example, the network interface module 314 may allow a user of the computing device 300 to begin or end capturing images or video, may allow a user to perform the various interpolation methodologies described herein. Additionally, the network interface module 314 may allow a user to generate interpolated frame(s) of data as well as receive image or video data from a remote image sensor, or a remote storage device. Moreover, the network interface module 314 may optionally include a display, in order to, inter alia, display the interpolated frame(s) of data and the captured frame(s) of data. Additionally, the network interface module 314 may include one or more network interface(s) to enable communication with, for example, other computing devices, whether similar or different.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

As used herein, the term "computing device", includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet.™), radio frequency tuner (e.g., in-band or OOB, cable modem, etc.), Wi-Fi (802.11a,b,g,n), WiMAX (802.16), PAN (802.15), or IrDA families.

As used herein, the terms "processing unit" and "processor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus configured to enable generation of interpolated frames of video data, the computerized apparatus comprising:
   an imaging module;
   an optical flow module in operative communication with the imaging module;
   a frame blending module in operative communication with the optical flow module;
   an edge correction module in operative communication with the frame blending module;
   a multi-pass module in operative communication with the frame blending module; and
   a single-pass module in operative communication with the edge correction module, wherein the single-pass module further comprises:
      an occlusion mask module configured to receive as input an output of the optical flow module;
      a dilation/erosion operations module; and
      an occlusion mask combiner module, the occlusion mask combiner module configured to output a combined occlusion mask to the edge correction module.

2. The computerized apparatus of claim 1, wherein the multi-pass module further comprises an optical flow replacement module, the optical flow replacement module configured to replace an optical flow value generated by the optical flow module for the generation of interpolated frames of video data.

3. The computerized apparatus of claim 2, wherein the multi-pass module further comprises a pixel intensity error module, the pixel intensity error module being configured to calculate one or more estimated frames based at least on a forward and a backward optical flow generated by the optical flow module.

4. The computerized apparatus of claim 3, wherein the multi-pass module further comprises a segmentation module, the segmentation module configured to reduce or eliminate artifacts in the generation of interpolated frames of video data by virtue of segmentation of inaccurate optical flow information for use by the optical flow replacement module.

5. The computerized apparatus of claim 4, wherein the multi-pass module further comprises a tiling module and a statistics calculation module, wherein:
   the tiling module is configured to divide calculated frame errors determined by the pixel intensity error module into a plurality of tiles; and
   the statistics calculation module is configured to calculate statistical outliers on a per-tile basis of the plurality of tiles.

6. A computerized apparatus configured to enable generation of interpolated frames of video data, the computerized apparatus comprising:
   processor apparatus; and
   storage apparatus in data communication with the processor apparatus and comprising a storage medium having at least one computer program stored thereon, the at least one computer program comprising:
      an imaging function, the imaging function comprising one or more imaging sensors configured to capture imaging content, the imaging content comprising at least a first frame and a second frame;

an optical flow function in operative communication with at least the imaging function, the optical flow function configured to calculate a forward optical flow and a backward optical flow, the forward optical flow being calculated based at least on a calculation from the first frame to the second frame, the backward optical flow being generated based at least on a calculation from the second frame to the first frame;

a frame blending function in operative communication with at least the optical flow function;

an edge correction function in operative communication with at least the frame blending function;

a multi-pass function in operative communication with at least the frame blending function; and a single-pass function in operative communication with at least the edge correction function;

wherein:

the at least one computer program is configured to, when executed by the processor apparatus, generate a plurality of interpolated frames of video data; and the single-pass function is configured to (i) generate at least an occlusion mask based at least on the generated forward and backward optical flows, and (ii) cause edge correction by the edge correction function on at least one of the generated plurality of interpolated frames based at least in part on the generated at least occlusion mask.

7. The computerized apparatus of claim 6, wherein the multi-pass function is configured to (i) calculate one or more estimated frames based on the generated forward and backward optical flows, and (ii) based at least on the calculated one or more estimated frames, determine at least one frame error associated with each of the first frame and the second frame.

8. The computerized apparatus of claim 7, wherein the multi-pass function is further configured to:

determine one or more statistical outliers for at least a portion of each of the determined at least one frame error;

compare a number of the one or more statistical outliers against a threshold number; and based at least on a determination that the number exceeds the threshold number, recalculate at least one of the forward optical flow or the backward optical flow.

9. The computerized apparatus of claim 8, wherein the multi-pass function is further configured to:

based at least on a determination that the number does not exceed the threshold number, cause the frame blending function to (i) blend at least the first and second frames and (ii) generate an interpolated frame based on the blend of the at least first and second frames.

10. The computerized apparatus of claim 6, wherein the generated at least occlusion mask comprises a combined occlusion mask, the combined occlusion mask being generated based at least on a merge of a forward occlusion mask associated with the forward optical flow and a backward occlusion mask associated with the backward optical flow.

11. The computerized apparatus of claim 6, wherein the single-pass function is further configured to cause the frame blending function to, subsequent to the edge correction, (i) blend at least the first and second frames and (ii) generate an interpolated frame based at least on the blend of the at least the first and second frames.

12. The computerized apparatus of claim 6, wherein:

the frame blending function is further in operative communication with the multi-pass function and the single-pass function, the operative communication with the single-pass function comprising operative communication via the edge correction function; and the frame blending function is configured to receive processed data, wherein the processed data comprises one or more of (i) at least one updated version of an optical flow generated by the optical flow function, the at least one updated version being generated by the multi-pass function, or (ii) at least an occlusion mask generated by the single-pass function.

13. A method for generating interpolated frames using a computerized apparatus, the method comprising:

using an imaging module of the computerized apparatus to obtain first imaging data and second imaging data;

using an optical flow module of the computerized apparatus to generate one or more optical flows associated with the first and second imaging data;

performing one or more of (i) a first operation via a multi-pass module of the computerized apparatus, or (ii) a second operation via a single-pass module of the computerized apparatus, wherein the performing of the second operation via the single-pass module comprises, based at least on the generated one or more optical flows, enabling edge correction of one of the first imaging data or the second imaging data, the edge correction comprising a correction of a portion that is present in only one of the first imaging data or the second imaging data; and using a frame blending module of the computerized apparatus to, based at least on data obtained via the performing, blend the first and second imaging data, the blend comprising production of one or more interpolated frames from the first and second imaging data.

14. The method of claim 13, wherein the performing of the first operation via the multi-pass module comprises detecting, based at least on the generated one or more optical flows, one or more frame errors in at least one of the first imaging data or the second imaging data.

15. The method of claim 14, wherein the performing of the first operation via the multi-pass module comprises (i) generating one or more updated optical flows responsive to a determination that a magnitude associated with the one or more frame errors exceeds a threshold value, and (ii) replacing the generated one or more optical flows with the one or more updated optical flows.

16. The method of claim 13, wherein:

the performing of the one or more of the first operation or the second operation comprises performing both the first and second operations;

the performing of the second operation via the single-pass module comprises generating one or more occlusion masks based on the generated one or more optical flows; and the performing of the first operation via the multi-pass module comprises reducing imaging artifacts in the one or more interpolated frames based on one or more of (i) a probability of inaccurate information associated with the one or more optical flows, or (ii) the one or more occlusion masks generated by the single-pass module.

* * * * *